United States Patent
Blackburn et al.

(10) Patent No.: US 7,160,366 B2
(45) Date of Patent: Jan. 9, 2007

(54) FILTER ELEMENT

(75) Inventors: Andrew John Blackburn, Winchester (GB); Stephen Robert Tennison, Addlestone (GB); Anthony Paul Rawlinson, Sunbury-on-Thames (GB)

(73) Assignee: Mast Carbon International Ltd., Plymouth (GB)

( * ) Notice: Subject to any disclaimer, the term of this patent is extended or adjusted under 35 U.S.C. 154(b) by 0 days.

(21) Appl. No.: 10/760,083

(22) Filed: Jan. 16, 2004

(65) Prior Publication Data

US 2005/0126395 A1 Jun. 16, 2005

Related U.S. Application Data

(63) Continuation of application No. PCT/GB02/03259, filed on Jul. 16, 2002.

(51) Int. Cl.
*B01D 53/02* (2006.01)

(52) U.S. Cl. .......................... 96/108; 96/153

(58) Field of Classification Search ................ 96/108, 96/131, 134, 135, 153, 154; 55/385.3, 514, 55/523, 527

See application file for complete search history.

(56) References Cited

U.S. PATENT DOCUMENTS

| 3,006,346 | A | * | 10/1961 | Golding ................... 131/332 |
| 3,091,550 | A | | 5/1963 | Doying ..................... 117/76 |
| 3,217,715 | A | | 11/1965 | Berger et al. ............... 131/10 |
| 3,353,544 | A | | 11/1967 | Fordyce et al. ............. 131/267 |
| 3,354,886 | A | | 11/1967 | Berger et al. ............... 131/10.9 |
| 3,375,933 | A | | 4/1968 | Rodman ..................... 210/502 |
| 3,474,600 | A | | 10/1969 | Tobias ....................... 55/524 |
| 3,538,020 | A | | 11/1970 | Heskett et al. .............. 210/496 |
| 3,544,507 | A | | 12/1970 | Lloyd ........................ 260/39 |
| 3,611,678 | A | | 10/1971 | Holden ....................... 55/387 |
| 3,645,072 | A | | 2/1972 | Clapham ..................... 55/387 |
| 3,721,072 | A | | 3/1973 | Clapham ..................... 55/387 |
| 3,813,347 | A | | 5/1974 | Hayes ........................ 252/428 |
| 3,919,369 | A | | 11/1975 | Holden ....................... 264/45.1 |
| 3,971,373 | A | | 7/1976 | Braun ........................ 128/146.2 |
| 4,046,939 | A | | 9/1977 | Hart .......................... 428/311 |
| RE29,501 | E | | 12/1977 | Lapidus ...................... 36/44 |
| 4,061,807 | A | | 12/1977 | Shaler et al. ................ 428/36 |
| 4,181,513 | A | * | 1/1980 | Fukuda et al. ............... 96/153 |
| 4,386,947 | A | | 6/1983 | Mizuno et al. .............. 55/387 |
| 4,399,052 | A | | 8/1983 | Sugino ....................... 252/421 |
| 4,540,625 | A | | 9/1985 | Sherwood .................... 428/283 |
| 4,677,019 | A | | 6/1987 | von Blücher ................ 428/244 |
| 4,904,343 | A | | 2/1990 | Giglia et al. ................ 162/145 |
| 5,194,414 | A | * | 3/1993 | Kuma ......................... 502/80 |
| 5,324,703 | A | | 6/1994 | McCue et al. ............... 502/424 |
| 5,350,443 | A | * | 9/1994 | von Blucher et al. ......... 96/135 |
| 5,389,325 | A | | 2/1995 | Bookbinder et al. ... 264/177.12 |
| 5,510,063 | A | | 4/1996 | Gadkaree et al. ........... 264/29.7 |
| 5,597,617 | A | | 1/1997 | DeLiso et al. .............. 427/228 |

(Continued)

FOREIGN PATENT DOCUMENTS

EP 0254551 1/1988

(Continued)

*Primary Examiner*—Robert A. Hopkins
(74) *Attorney, Agent, or Firm*—Baker Botts LLP

(57) ABSTRACT

An improved filter element which can be used in gas masks is formed of short lengths of porous monolithic carbon formed by partially curing a phenolic resin to a solid, comminuting the partially cured resin, extruding the comminuted resin, sintering the extruded resin so as to produce a form-stable sintered product and carbonising and activating the form-stable sintered product.

20 Claims, 12 Drawing Sheets

U.S. PATENT DOCUMENTS

| | | | |
|---|---|---|---|
| 5,626,820 A | 5/1997 | Kinkead et al. | 422/122 |
| 5,628,819 A | 5/1997 | Mestemaker et al. | 96/122 |
| 5,648,027 A | 7/1997 | Tajiri et al. | 264/43 |
| 5,685,936 A | 11/1997 | Komine et al. | 156/182 |
| 5,776,227 A | 7/1998 | Meiller et al. | 96/134 |
| 5,786,059 A | 7/1998 | Frank et al. | 442/68 |
| 5,820,967 A | 10/1998 | Gadkaree | 428/116 |
| 5,827,355 A | 10/1998 | Wilson et al. | 95/114 |
| 5,972,081 A * | 10/1999 | Selby | 96/131 |
| 6,114,006 A | 9/2000 | Walker | 428/116 |
| 6,187,713 B1 * | 2/2001 | Gadkaree | 502/425 |
| 6,284,705 B1 | 9/2001 | Park et al. | 502/417 |
| 2001/0045161 A1 * | 11/2001 | McMahon | 95/116 |
| 2002/0020292 A1 * | 2/2002 | Wojtowicz et al. | 95/116 |
| 2002/0073847 A1 * | 6/2002 | Sheline et al. | 95/143 |
| 2003/0019361 A1 * | 1/2003 | Wolff et al. | 96/134 |

FOREIGN PATENT DOCUMENTS

| | | |
|---|---|---|
| EP | 0585016 | 3/1994 |
| EP | 0626199 | 11/1994 |
| EP | 0745416 | 12/1996 |
| GB | 1330296 | 9/1973 |
| WO | 9962616 | 12/1999 |

* cited by examiner

FILTER ELEMENT

CROSS-REFERENCE TO RELATED APPLICATIONS

This application is a continuation of International Application No. PCT/GB02/03259, which was filed on Jul. 16, 2002 and which claims priority from U.K. Application No. GB 0117212.1, which was filed on Jul. 16, 2001.

The present invention relates to a low pressure drop device for removing contaminants from fluids. More particularly it relates to the use of carbon monoliths for removing contaminants from gases such as air.

There is a large demand for improved low pressure drop vapour removal devices for use in, for example, personal protection devices (gas masks) for protection against industrial toxic gases, for the removal of low levels of contaminants from air, in for instance electronic device fabrication plants, operating theatres etc. for the purification of air in for instance enclosed spaces such as buildings, aircraft and vehicles (cabin air filtration), for the elimination of gasoline vapour release from vehicles and for the control of contaminants in cigarette smoke.

In personal protection devices adsorbent structures have long been used for the filtration of fluids and some forms have been specifically developed for use in gas and vapour respirators. These known structures are generally classified according to the manner in which the adsorbent material is supported and include (a) packed beds, (b) loaded nonwovens, (c) loaded foams and (d) bonded adsorbents. Of these known adsorbent structures, only the packed beds have been developed sufficiently to meet the stringent filtration and air flow requirements necessary for gas and vapour respirator approval from the pertinent regulatory agency. In such packed beds, adsorbent particles are constrained in a container by compressive forces imposed on and transmitted through the particle bed by rigid grids and screens which cover the inlet and outlet areas. Virtually all such packed bed filters are cylindrical, have constant thickness or bed depth and have a planar inlet and outlet. The adsorbent particles are filled layerwise by pouring through screens. The screens scatter the particles as they fall resulting in a level filled bed packed to substantially maximum density per unit volume. The compressive forces applied by the constraining grids and screens restrain particle movement to thereby minimize flow channelling within the packed bed.

Although gas and vapour respirators with packed bed filter elements satisfy the necessary performance parameters, the very nature of the packed beds has imposed severe constraints on overall respirator design. Thus, their cylindrical geometry dictates incorporating the filter element as an appendage (external cartridge) on the respirator which results in some interference with vision and an increase in the number of respirator parts. Another problem encountered with packed beds for use in a volume sensitive product such as a respirator is that the retaining grids and screens themselves add to the total volume and consequently add bulk to the filter element. A still further problem is experienced when a packed bed respirator is combined in series with a particulate filter for use in environments containing particulates as well as vapour hazards such as in paint spray applications. In this situation, the retaining grids and screens create nonuniform airflow pathways within the particulate filter resulting in reduced utilization of the filter media and increased pressure drop there through.

Adsorbent loaded nonwoven structures such as described in U.S. Pat. No. 3,971,373 contain adsorbent particles in the interstices between the fibres forming the nonwoven web. Such structures permit the manufacture of conformable shaped respirators thus overcoming the design restrictions imposed by the geometry of packed bed adsorbent structures. However, the high density of adsorbent particles achieved in the packed bed structures is lost in the adsorbent loaded nonwoven structures because the fibres themselves act as spacers between the adsorbent particles. This low adsorbent density makes it difficult, if not impossible, to achieve the filtration requirements for approvable respirators since it is difficult to pack sufficient adsorbent particles into the small available volume of a respirator. Another form of adsorbent loaded nonwoven structure is adsorbent paper where adsorbent particles are incorporated in the spaces between the paper fibres; these adsorbent papers are also lower density structures.

Open celled loaded foam structures containing adsorbent particles dispersed within and bonded in the foam structure have been developed for various uses, e.g., as an adsorbent composite for evaporative emission control for automobiles (U.S. Pat. No. 3,813,347), a carbon impregnated foam particularly suited for protective clothing against noxious chemicals in liquid or vapour form (U.S. Pat. No. 4,046,939) and an impregnated foam sheet deodorizer insole (U.S. Pat. Re. No. 29,501). Most of the loaded foam structures also suffer the limited density disadvantage of the loaded nonwoven structures thus limiting their use in respirators.

Bonded adsorbent structures have been utilized as liquid filters for many years. While these structures have had the potential for the high adsorbent densities needed for respirators and other critical air filter uses, that potential has not been recognized and exploited.

The known bonded adsorbent structures can be subdivided into two major classifications, viz., those in which the contaminant must first pass through a polymeric binder coating surrounding the adsorbent particle before it is adsorbed by the particle and those where the contaminant encounters the adsorbent particle through uncoated areas on the adsorbent surface.

Examples of bonded adsorbent structures where the adsorbent particles are coated by a polymeric binder are U.S. Pat. No. 3,091,550 directed to semi-rigid materials having a bonded adsorbent coating thereon and U.S. Pat. No. 4,386,947 directed to apparatus for adsorbing fuel vapour in an internal combustion engine wherein the vapour adsorbent is preferably formed from layers of moulded monolithic honeycombed activated carbon bodies.

The second type of bonded adsorbent structures, where portions of the adsorbent particle surface are exposed, is exemplified by U.S. Pat. Nos. 3,217,715; 3,353,544; 3,354,886; 3,375,933; 3,474,600; 3,544,507; 3,645,072; 3,721,072; 3,919,369; 4,061,807 and 3,538,020. Of the myriad of intended applications for these bonded adsorbent structures, only U.S. Pat. No. 3,544,507 suggests, in passing, that the agglomerated carbon particles produced could be used as gas mask filters, presumably as a packed bed cartridge. U.S. Pat. No. 3,538,020 is directed to bonded adsorbent bodies comprised of fluid treating aggregate particles such as ion exchange resins, activated charcoal, manganese greensand, sawdust and like materials bound together in closely packed abutting relationship in a matrix of a polymeric material such as polyurethane, the aggregate particles being spaced essentially as they would be in a packed bed. It is, however, expected that a significant portion of the interstitial volume will be occupied by the binder matrix with a resultant increase in pressure drop in the bonded structures. Since no respirator use is suggested in the patent, any possible respirator use to be inferred for such structures would be as substitutes for packed bed filter cartridges. While this patent and a number of the above noted patents state that the bonded adsorbent structures could be moulded into any desired shape, most of the shapes exemplified are flat or cylindrical bodies. U.S. Pat. No. 3,721,072 does disclose a differently shaped filter comprising activated carbon granules bonded together into a monolithic extended surface shape in the form of a wave, the filter being particularly useful in air handling systems according to the patentee.

The fact remains that none of the patents specifically addresses respirator applications nor provides any basis for concluding that such bonded adsorbent structures could be used as the filter elements in respirators where high dynamic capacity and high efficiency contaminant removal with low pressure drops and uniform air flow are essential characteristics.

The monolithic adsorbents of the current invention overcome all of the problems associated with these various adsorbent forms.

Air filtering is also critical in the manufacture of semiconductor devices. Tremendous efforts are made to eliminate contaminants from the semiconductor device manufacturing site, commonly referred to as a clean room. Clean room contaminants may be generally classified as either particulate or gas-phase. Common particulate contaminants include dust, lint and other debris. Examples of gas-phase contaminants, which are dimensionally 30,000–40,000 times smaller than particulate contaminants, include acid gases, base gases including ammonia and other reactive amines, volatile organic compounds (VOCs), and boron.

Until recently, most of the efforts in clean room design have focused on removing particulate contaminants, which were viewed as having the most impact on device yields and device performance. However, it has been discovered that gaseous contamination is an important limiting factor in the further reduction of device geometry and the improvement of device performance.

Attempts have been made to reduce gas-phase contamination by incorporating traditional rack and tray type gas-phase filters into existing cleanroom air handling systems. A rack and tray filter generally includes a perforated metal structure which contains loose sorbent particles. Because rack and tray filters tend to generate large quantities of particulate contamination (due, at least in part, to the vibration of air handling systems), additional particulate filters, preceding a final high-efficiency particulate air (HEPA) filter, are required downstream from the rack and tray system. These additional particulate filters require frequent servicing due to accumulation of particles in the filters.

An alternative approach (U.S. Pat. No. 5,626,820) is to use carbon particle loaded expanded fibrous sheets. These partially overcome the problems associated with particulate loss from granular beds and also give improved control over pressure drop. There is still however a tendency to generate small particles of activated carbon which must be trapped by downstream filters. The adsorption efficiency of the fibrous mats is also limited by the relatively low mass per unit volume of the adsorbing carbon and large carbon particle size that is required to minimise particle loss.

Low pressure drop is also a prerequisite in air conditioning adsorption applications for houses and other enclosed living/working spaces where there is a very restricted capability to push the high air flows through granular adsorbent beds. At present this can only be met by large cross section granular beds which still place a significant load on the air circulation systems and can only be applied to large, centralised facilities. It is not at present possible to include effective carbon filters in the smaller, individual air conditioning units used in houses due to the air flow constraints. The monoliths of the current invention are ideally suited to this kind of application and to portable units that could for instance be used during building refurbishment, painting etc. The system could also be applied to for instance cabin air filtration systems in vehicles and aircraft.

Concern for the environment and ever increasingly strict emissions regulations are also requiring automotive manufacturers to reduce greatly or eliminate altogether gasoline emissions from air induction systems and vehicle fuel tanks and engines when the automobile is shut off. One source of these evaporative emissions is created by unburned fuel remaining in the intake manifold once the engine stops. A closed system approach for controlling these emissions comprises blocking off the induction system thereby preventing gasoline vapours from leaking out. An open system approach comprises adsorbing the gasoline with a hydrocarbon (HC) adsorber.

Carbon impregnated materials may be used to adsorb hydrocarbon emissions. Typically, carbon powder is mixed with a phenolic resin (or binder) and applied to a base material. In one investigation, a resin impregnated cellulose material was employed in place of the air filter. Unfortunately, the resin used to bind the carbon closed off the pores in the carbon, thus eliminating its ability to adsorb hydrocarbons.

A major challenge for creating a HC adsorber for the air induction system is to minimize the impact of the HC adsorber on the air intake restriction whilst maintaining a high adsorption efficiency when the engine is not operating although the total mass to be adsorbed is low (<1 g). The gas flow through the filter system can be as high as 10000 L/min with a requirement for a pressure drop no greater than 0.5 kPa. A further challenge is to create a HC adsorber that adds little cost to the system, keeps restriction low, and provides sufficient hydrocarbon adsorption working capacity for the particular application.

U.S. Patent Application No. 2001 000960860 discloses an integrated air filter and hydrocarbon adsorbing apparatus includes an air filter comprising a filter media disposed on a screen support and an air permeable hydrocarbon adsorbing material disposed between the filter media and the screen support at the air stream outlet end of the apparatus. The hydrocarbon adsorbing material is situated to adsorb hydrocarbon emissions at the clean air side of an air stream flowing through the apparatus. The treated air stream exits through the air stream outlet, typically to an inlet of an engine air induction system. In an alternate embodiment, the integrated air filter and hydrocarbon adsorbing apparatus comprises a hydrocarbon adsorbing coating directly disposed on a portion of the air filter adjacent the air stream outlet. The problem with such a device arises from the limited carbon content of such filters and the potential for the sheet filter to generate carbon particulates that will then be sucked into the engine during operation.

A further source of vapour emissions is from the gasoline tank and the engine once the engine is switched of. This is known as "hot soak" loss. These emissions can also be trapped by a carbon adsorbent bed although in this instance the mass to be adsorbed is high but the gas flow constraints are greatly reduced.

In a further requirement the carbon adsorption bed can be required to trap the gasoline vapour displaced from the fuel tank when the tank is filled. This is potentially the most demanding adsorption requirement as the amount of vapour to be trapped is equivalent to the saturation vapour concentration in the total fuel tank volume that can be up to 2 g/mol of gasoline vapours (potentially around 100 g).

In all of these cases whilst the adsorption can be readily achieved on activated carbon the system performance is dominated by regeneration. In all three examples regeneration is simply by sucking clean air through the filter in the reverse direction of adsorption. In the case of the inlet air filter this regeneration flow amounts to perhaps 20 m³ of air in a four hour period. By contrast, for the hot soak and refuelling situations the air flow is limited to a small purge flow that carries the desorbed vapour to the fuel inlet manifold.

The nature of the regeneration process is such that whilst the equilibrium adsorption capacity of the carbons can exceed 50% weight the working capacity, defined as the uptake after many adsorption desorption cycles and once the bed has reached a stable operating performance, is frequently less than 5%, and it is this that fixes the volume of adsorbate required. A great deal of effort has been expended on both optimising the design of the adsorber system to provide the best possible gas flows etc (e.g., U.S. Pat. No. 5,776,227) for regeneration and on the optimisation of the adsorbent to provide improved regeneration characteristics (e.g., U.S. Pat. No. 5,324,703). The bed volumes are however still large and these can present both a significant pressure drop constraint and problems with attrition of the carbon granules and bed settling.

We have now shown that the requirements of a high adsorptive working capacity, combined with a low pressure drop that has minimal impact on the engine during normal operation but has sufficient mechanical integrity to withstand the extremely high gas velocities and vibration associated with the air induction manifold can be met using the monoliths of the current invention. The same monoliths can also be used to provide a novel bed geometry that overcomes the problems of pressure drop and bed settling whilst providing acceptable regeneration characteristics to give enhanced working capacity and therefore a reduced bed volume.

All of the filter systems using of the monoliths of the current invention fall into three main categories. In each case the current invention can be shown to provide substantial benefits over these alternatives. Several approaches to the production of extruded channel structures with similar physical forms to the monoliths of the current invention have been published. U.S. Pat. No. 5,597,617 discloses the production of a carbon monolith by resin coating a preformed ceramic monolith and then further thermally treating the ceramic-resin composite to pyrolyse the polymer. This has several disadvantages. The carbon content of the monolith is inevitably lower than that of the pure carbon monolith of the current invention whilst the electrical and thermal conductivity of the structure is also limited by the conductivity of the ceramic support. The presence of the ceramic can also limit the chemical stability of the composite structure. The form of the channel structure is also limited by the constraints imposed by the ceramic monolith production process. The resulting structures are also too expensive for many applications.

Forming activated carbon structures from precursors such as resins has also been disclosed in U.S. Pat. No. 5,510,063, Apr. 23, 1996 and U.S. application Ser. No. 08/228,265 filed Apr. 15, 1994. While these methods produce relatively simple shapes, high cell density honeycombs may be difficult to produce.

U.S. Pat. No. 4,399,052 discloses direct extrusion of honeycombs from resins followed by carbonisation and activation to make activated carbon honeycombs. There are several problems associated with this process. The process involves mixing of solid phenolic resins (Novolaks) and liquid phenolic resins (resoles), two thermoset resins, which react with each other during extrusion. The reaction causes foaming of the extruded structure and destroys the structure. The mixture also becomes rubbery and is very difficult to extrude. Thus no useful honeycomb structures can be made using this process. Another problem associated with this process is that during carbonisation and activation, about 60–65% by weight of the resin is lost as low molecular weight compounds. Such a large weight loss associated with the process causes large shrinkages and such honeycombs, produced from dense resin structures, are prone to severe distortions and cracking. This problem can be avoided to some extent by slow heat-up rates. The evolution of volatiles still remains a problem however, because for a given wall thickness of the honeycomb, it is difficult to remove the carbonisation by-products from the interior of the dense honeycomb structure. The low molecular weight by-products build up inside the honeycomb walls and the structure explodes into many fragments.

U.S. Pat. No. 5,820,967 describes the production of extruded monolithic structures using typically phenolic resins in combination with a wide variety of fillers including for instance carbonisable fibrous materials and inorganic materials. The production method relies on the resin system forming a good bond to the filler material and that these fillers should typically be oxygen containing. It is claimed that carbon cannot be used as the bond between the binder and the carbon is poor resulting in poor strength monolithic structures on subsequent firing. For liquid resin systems, it was found that addition of a hydrophilic carbonisable (essentially organic) filler, with or without a hydrophobic organic filler, (preferably fibrous), is necessary to form a good honeycomb extrusion. Hydrophilic organic fibrous filler allows the liquid resin to infiltrate the fibrous structure at high loading levels. The mixture has good rigidity and is extruded into a honeycomb shape easily and maintains the shape on carbonisation. Inorganic hydrophilic fillers preferably with a fibrous morphology can also be used with liquid resins in addition to the carbonisable filler. Mixtures of organic and inorganic fillers result in optimised strength and rigidity of the final carbon product, as well as minimization of cost. Inorganic fillers also minimize shrinkage and warpage.

Both natural and synthetic carbonisable fillers can be used. Some natural materials are soft woods, e.g. pine, spruce, redwood, etc., hardwoods e.g. ash, beech, birch, maple, oak, etc., sawdust, shell fibres e.g. ground almond shell, coconut shell, apricot pit shell, peanut shell, pecan shell, walnut shell, etc., cotton fibres e.g. cotton flock, cotton fabric, cellulose fibres, cotton seed fibre, chopped vegetable fibres for example, hemp, coconut fibre, jute, sisal, and other materials such as corn cobs, citrus pulp (dried), soybean meal, peat moss, wheat straw, wool fibres, corn, potato, rice, and tapioca etc. Some synthetic materials are regenerated cellulose, rayon fabric, cellophane, etc.

Some examples of carbonisable fillers that are especially suited for liquid resins are cellulose, cotton, wood, and sisal, or combinations of these, all of which are preferably in the form of fibres.

One especially suited carbonisable fibre filler is cellulose fibre as supplied by International Filler Corporation, North Tonowanda, N.Y. This material has the following sieve analysis: 1–2% on 40 mesh (420 micrometers), 90–95% thru 100 mesh (149 micrometers), and 55–60%, thru 200 mesh (74 micrometer).

Some inorganic fillers that can be used are oxygen containing minerals such as clays, zeolites, talc, etc., carbonates, such as calcium carbonate, aluminosilicates such as kaolin (an aluminosilicate clay), flyash (an aluminosilicate ash obtained after coal firing in power plants), silicates, e.g. wollastonite (calcium metasilicate), titanates, zirconates, zirconia, zirconia spinel, magnesium aluminum silicates, mullite, alumina, alumina trihydrate, spinel, feldspar, attapulgites, and aluminosilicate fibres, cordierite powder, sand (silica), vermiculite, etc.

Some examples of especially suited inorganic fillers are cordierite powder, talcs, clays, and aluminosilicate fibres such as provided by Carborundum Co. Niagara Falls, N.Y. under the name of Fiberfax, and combinations of these. Fiberfax aluminosilicate fibres measure about 2–6 micrometers in diameter and about 20–50 micrometers in length.

In all cases the inorganic component was present in the extrusion mix at between 20 and 70% weight which would then give a maximum carbon content of typically 30 to 15% weight in the finished carbon monolith. This is clearly disadvantageous in achieving a high volumetric capacity. The presence of the ceramics will also lead to a poor or non existent electrical conductivity and reduced thermal capacity.

Extruded monoliths can also be produced where a ceramic material is used as the binder for the particulate carbon matrix (U.S. Pat. No. 6,284,705). In this case high strength monoliths can only be achieved when the carbon content is limited to 30% weight. Increasing the loading to 50% results in a substantial decrease. Maximum strength is also only achieved after firing at very high temperatures (e.g. >1200 C) which can cause a significant degradation in the carbon properties. Even then the monoliths have a maximum axial crush strength of 1600 psi. Such monoliths suffer from the primary defects of the other systems in that they have low carbon contents, poor thermal and electrical conductivity and relatively poor strength.

Monolithic structures can also be produced using polymers to bind together activated carbon particles. U.S. Pat. No. 5,389,325 claims the production of monoliths based on activated carbon combined with between 3 and 35% weight of a phenolic resin along with up to 10% weight of an extrusion aid such as methyl cellulose where the resin is cured but not recarbonised. This has the clear disadvantage that the resulting structure contains a cured resin which will have limited thermal and chemical stability whilst also eliminating the electrical conductivity of the monolith. The use of the resin binder can also significantly reduce the performance of the activated carbon powder by blocking the pores of the activated carbon if it is used at a high enough concentration to give good mechanical properties. Levels of at least 25% weight are required which result in a reduction in a 50% reduction in adsorption capacity.

An alternative approach to the formation of a low pressure drop channel structure is through the use of stacked or rolled corrugated sheets where the channels are generated by the corrugations. In these structures the adsorbent properties can be provided by the sheets themselves, when the fibres comprising the sheets are activated carbon fibres (U.S. Pat. No. 6,114,006, U.S. Pat. No. 5,685,936), or by bonding activated carbon particles directly to the surface of the porous (U.S. Pat. No. 4,677,019, U.S. Pat. No. 4,904,343) or non porous sheet. Whilst the carbon fibre based systems have a reasonable carbon volumetric loading the cost of the materials is generally very high and the performance of the fibres is degraded by the presence of the polymer binders. In the case of the sheets systems with the bonded carbon particles the carbon volumetric loading is generally very poor whilst the mechanical properties of the materials can also be poor.

The problems associated with the use of polymer binders in U.S. Pat. No. 6,114,006, U.S. Pat. No. 5,685,936 have been overcome in U.S. Pat. No. 5,827,355 which claims a 3D carbon bonded carbon fibre structure and in U.S. Pat. No. 5,648,027 where a 2D carbon bonded carbon fibre sheet is produced by a similar method. In these systems the carbon fibres are bonded with phenolic resin and the entire system is recarbonised and subsequently activated. This avoids the problems associated with polymer coating of the carbon fibres as the bonding agent is now a high surface area carbon in its own right. However the mechanical properties of such systems are poor. The pressure drop in these systems is controlled by the density of the fibre packing. To achieve a high volumetric carbon loading requires dense fibre packing which then gives significantly worse pressure drop properties than can be achieved with the monolithic structures of the present invention. Conversely at similar pressure drops the fibre packing is very low giving a low uptake capacity.

An alternative and cheaper cost option to the carbon bonded carbon fibre matrix in U.S. Pat. No. 5,827,355 are polymeric fibre structures containing granular carbon particles. These have the benefit that high carbon loadings of small carbon particles are possible and that the resulting fibre system is flexible. However the pressure drop remains poor if a high volumetric loading of the carbon is required and, in U.S. Pat. No. 4,540,625 and similar patents, the performance of the carbon is also significantly degraded by adsorption of the polymer binding agent during the forming process. The use of the fibre system is also limited by the thermal and chemical properties of the fibre matrix.

An alternative process which does not use binder polymers, but relies on the presence of a fibre system with a reduced melting point, that bonds to the non melting polymer fibres and the carbon matrix is exemplified in U.S. Pat. No. 5,786,059. This in part overcomes the problems associated with adsorption of the binding agent onto the carbon matrix but still leads to reduced capacity in the carbon, low overall capacity due to the restricted carbon loading per unit volume, and poor overall thermal properties. Residual problems with the molten polymer interacting with the carbon matrix have been overcome through the use of melt spun fibres in conjunction with granular carbons although these still have poor loading and pressure drop characteristics.

It can be seen in the previous discussion that all existing formed adsorbent systems have significant drawbacks. Existing extruded monolithic channel structures have the pressure drop capabilities of the monoliths of the current invention but are compromised by the presence of inorganic or polymeric binders or substrate ceramics that reduce the carbon loading per unit volume and the system strength and also reduce the thermal and electrical conductivity. The binders can also reduce the inherent capacity of the carbon component of the matrix. Any approach based on fibre systems has inferior pressure drop characteristics to the channel structure monoliths whilst, with the exception of the carbon fibre systems, significantly reducing the available adsorbent carbon per unit volume. In the case of the carbon fibre systems the higher carbon loading is offset by the much higher costs of the precursor fibres. The polymer fibre/bonded systems also have poor thermal and chemical resistance. The final, bound particulate systems, have a high carbon loading per unit volume but inevitably have poor pressure drop, essentially equivalent to granular carbon systems. Their only advantage arises from improved better bed packing, the elimination of bed settlement problems and some aspects of device manufacture. The presence of the polymer binders also reduces the thermal and chemical resistance of these systems.

The present invention enables there to be produced filter elements which have greatly improved pressure drop compared to all other matrices which offers major benefits in many of the applications discussed above.

It has been previously assumed that the laminar flow in the monolith channels significantly reduced the monolith adsorption efficiency relative to packed beds, leading to inferior breakthrough characteristics so that there would be a requirement for long monoliths and larger amounts of carbon to give equivalent performance to packed bed systems and monolith carbon structures of the type of the present invention have not been used or disclosed as filter elements for gases. We have now surprisingly found that, with the monoliths of the current invention, that this is not the case. In the monoliths of the current invention the channel structure can be controlled over a wide range dimensions, and the structure of the channel wall can be optimised to give improved mass transfer enables it to be possible to produce a monolithic structure where the pressure drop can be reduced by at least an order of magnitude compared to a granular bed but where the adsorption efficiency is also higher than an equivalent mass of granular adsorbent.

Furthermore the adsorption efficiency can be further enhanced, without significantly increasing the pressure drop, through the use of multiple monolith segments.

According to the invention there is provided a filter element for removing contaminants from gases which comprises a monolithic porous carbon structure.

The invention also provides apparatus for the removal of contaminants from gases such as air which apparatus comprises a container containing a monolithic porous carbon filter element an inlet and an outlet for the container whereby gases can pass via the inlet through the filter element and out through the outlet.

By "porous" is meant that the walls of the carbon monolithic have continuous voids or pores through which liquid or vapours can pass.

By monolithic is meant that the porous carbon is in a single piece i.e. not granular or not composed of granular carbons bound together by a binder etc. The monolithic carbon preferably contains large transport channels through which the gas can flow and by which means the pressure drop can be controlled.

Figure 1:
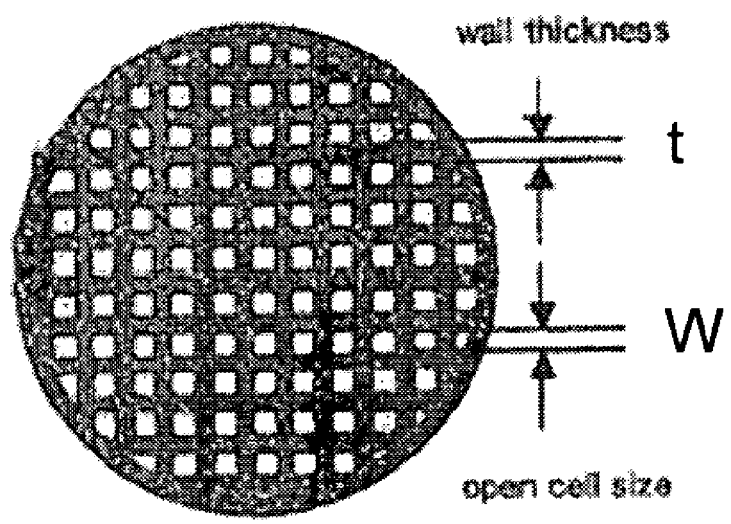
FIG. 1 is an exemplary monolith according to the present invention.

Referring to FIG. 1. The monolith can be characterised by the wall thickness "t" and the channel size "W".

The monoliths of the invention can be made by a method which allows "W" and "t" to be adjusted across wide ranges with the only limitation that the percentage of the cross sectional area within the walls, does not exceed approximately 70%.

The monolithic porous carbon can be made by partially curing a phenolic resin to a solid, comminuting the partially cured resin, extruding the comminuted resin, preferably using viscosity modifiers and one or more of lubricants and adhesives, sintering the extruded resin so as to produce a form-stable sintered product and carbonising the form-stable sintered product.

EP 0 254 551 gives details of methods of forming porous phenolic resins suitable for forming the porous carbon structures used in the present invention and its contents are included herein by reference. Porous phenolic resins are known as filter elements but hitherto porous carbon structures of the type disclosed in EP 0254 551 have not been used as filter elements for gases.

Phenolic resins are well known materials. They are made by the reaction of a phenol and an aldehyde e.g. formaldehyde. The condensation is initially carried out to produce a partially condensed product. The condensation may be carried out so as to produce a resol resin which is fully curable on further heating. Alternatively the condensation may be carried out so as to produce a Novolak resin which is only curable when an additional cross-linking agent is mixed with it e.g. hexamethylene tetramine (known as "hexamine" or "hex"). It is preferred to use hexamine-cured Novolak resins in the process of the present invention.

The resin cure should be controlled so that it is sufficient to prevent the resin melting during subsequent carbonisation but low enough that the particles produced during the milling step can sinter during subsequent processing. Preferably the temperature and duration of the partial curing step is selected as to give a degree of cure sufficient to give a sinterable product. This can be assessed from the crush strength of a carbonized 3 mm cylindrical extrudate prepared from the milled resin using methocell and polyethylene oxide as the extrusion agents. Preferably the pellet after carbonization has a radial crush strength measured with a conventional device for determining the crush strength of catalyst supports, of 5 kg.

By "sintering" we mean a step which causes the individual particles of phenolic resin to adhere together without the need for a separately introduced binder, while retaining their individual identity to a substantial extent on heating to carbonisation temperatures. Thus the particles must not melt after forming so as to produce a molten mass of resin, as this would eliminate the internal open porosity of the article. The open porosity (as opposed to the closed cells found in certain types of polymer foams) is believed to be important in enabling formed articles to retain their shape on carbonisation.

In one embodiment the comminuted resin particles have a mean particle size of 1 to 160 microns, more preferably from 10 to 100 microns which provides for a macropore size of between 2.5 and 25 microns with a macropore volume of around 40%.

The milled powder can then be extruded to produce polymeric monolithic structures with a wide range of cell structures, limited only by the ability to produce the required extrusion die and suitable dies are available commercially. Production of the monoliths is greatly facilitated by the extrusion of the cured resin powder rather than of a more abrasive ceramic or carbon powder. At this stage the monolith has a bimodal structure—the visible cell structure with open cells of around 300 to 2000 microns cell dimension and cell walls with thickness' between around 300 and 2000 microns—and the macropore structure within the walls generated by the voids between the sintered resin particles. An advantage of the current invention is that significantly smaller cell sizes can be produced than in existing monolithic structures as it is a polymer that is being extruded, rather than a ceramic material, which reduces abrasion of the die and the pressures required during extrusion. Cell densities of 44 cells per square cm (290 cells per square inch) have been achieved in the resin monoliths and it is believed that maximum cell densities in excess of 250 cpc are possible (>1600 cpi).

The viscosity modifiers which can be used include those described in EP 0254551 methyl celluloses, e.g. "Methocell" and the lubricants and adhesives can be selected from stearic acid and polyethylene glycol (PEG). The adhesives can be selected from acrylates, glycerol, ethylene glycol, polyethylene oxides, polyvinyl alcohol, hexamines, polystyrene etc.

The carbonisation steps take place preferably by heating above 600° C. for the requisite time e.g. 1 to 48 hours and takes place under an inert atmosphere or vacuum to prevent oxidation of the carbon. A further major advantage of the monoliths of the current invention is that the controlled porosity of the resin structure allows very high heating rates to be used without causing any distortion or cracking of the finished carbon structure despite the substantial weight and volume loss during pyrolysis. Heating rates in excess of 200 C per hour have been used with large monolithic structures without problems and the routine firing cycle is 100 C/hour to the carbonisation (800 C) or oxidation (~950 C) temperatures.

On carbonisation the material loses around 50% weight and shrinks by 50% volume but, provided the resin cure stage was correctly carried out, this shrinkage is accommodated with no distortion of the monolith matrix leading to a cell structure identical to that of the resin precursor but with dimensions reduced by approx 30%. The process is highly reproducible and can be used to produce net shape carbonised products with no requirement for further machining. The macropore size is also reduced by ~30% although the macropore volume (ml/ml) remains unaltered.

The shrinkage that occurs during carbonisation has a further benefit in that the monolith cell dimensions are reduced leading to approximately a doubling of the cell density. On this basis the cell density of the 44 cpc monoliths increases to 90 cpc (585 cpc) after carbonisation whilst the maximum theoretical density of 278 cpc in the green monoliths would give 570 cpc after carbonisation (3600 cpi).

During carbonisation, at temperatures above ~600 C, microstructure of the porous carbon develops. After carbonisation the monolith behaves as a molecular sieve due to partial blocking of the microstructure by the decomposition products from the carbonisation process. These blockages must be removed to provide fast access to the internal structure of the carbon that is essential for the operation of the monoliths as low pressure drop adsorbers. Activation can take place in either steam or carbon dioxide at temperatures above approximately 750° C. and 850° C. respectively or in combinations of these gases. The activation process is carried out for a time that varies with the temperature and the activation gas composition, such that a carbon weight loss of between 10 and 40% is achieved. Preferably the activation is carried out in $CO_2$ at 850 to 1000° C. Surface areas of up to 1500 $m^2/g$ can be developed through control of the activation stage although acceptable operation does not demand areas above around 800 $m^2/g$.

The monolithic carbons are resistant to high temperatures and are biologically inert.

This enables there to be a maximum carbon content within the monolith similar to or greater than that in a fixed granular bed where the voidage is typically around 40%. A key property of the monoliths is their low pressure drop which is controlled by both the open area and the size and distribution of the channels.

The structure can also be controlled within the wall where the particle size of the resin precursor, $D_P$, can be between around 5 microns and 100 microns. Extrusion considerations require that the mean resin precursor particle size should preferably not be greater than approximately 10% of the wall thickness. The mean macropore size is controlled by the resin precursor particle size such that the macropore size is approximately 20% of the resin particle size. This can impact upon the Poiseuille transport characteristics of the walls which can affect the adsorption efficiency of the monoliths where pressure gradient effects are significant, such as in pressure swing separation processes.

The monolith performance is also controlled by the micropore structure of the primary particles. The primary particles with diameter $D_P$ are believe to comprise microdomains with particle sizes, $d_P$, of around 5 nm. The micropores comprise the voids between these microdomains whilst the monolith surface area comprises the external surface of the microdomains. After carbonisation the micropore voids are partially filled with amorphous carbon deposits from the pyrolysis process. These substantially reduce the diffusivity within the micropores which reduces the overall monolith effectiveness. Activation is preferably carried out in either steam at temperatures above 800 C or carbon dioxide at temperatures above approximately 850 C. Their kinetic performance of the monoliths and the uptake in a gram/gram basis improves with activation extent whilst the uptake on a gram/volume basis decreases. It has been found that the optimum level of activation is typically around 20–30% although both lower and higher levels can be advantageous for specific applications.

The invention also provides apparatus for the removal of contaminants from air which apparatus comprises a monolithic porous carbon filter element and an inlet and an outlet for the filter element whereby air can be drawn via the inlet through the filter element and out through the outlet.

However the physical form of the monoliths also allows more complex gas flows to be engineered which can provide improved regeneration performance. In particular it is possible to carry out adsorption through a series of monolith segments.

Preferably the monoliths have a cell structure (cells per square cm-cpcm) where the channel size is between 200 and 1400 microns and the wall thickness is between 200 and 1400 microns and with an open area of between 30 and 60% to give a good carbon packing density per unit volume and acceptable mass transfer characteristics. The maximum attainable cell density is believed to be of the order of 560 per square cm (approximately 3600 per square inch) which is significantly in excess of the maximum attainable using ceramic based monoliths and bound carbon systems.

The monoliths preferably have a surface area of at least 600 $m^2/g$, preferably in excess of 800 $m^2/g$.

The monoliths can be produced in lengths from around 1 mm to 200 cm but for use in the present invention are preferably between 10 mm and 100 mm in length.

Monoliths produced by the above process can filter air with very low or immeasurably low pressure drop.

We have also surprisingly found that a significant improvement in performance can be obtained by using multiple, shorter, sections of the monoliths length and even more surprisingly that if the segments are separated by a small gap the performance is dramatically further improved and the invention also provides a filter element which comprises a plurality of porous carbon monoliths of from 1 to 3 cm in length separated by a gap of 0.5 to 1.5 cm.

In addition to their use in filtration devices the elements of the present invention can also be used in other applications such as catalyst supports etc.

In applications for low pressure drop vapour removal devices for use in the removal of low levels of contaminants from air, in for instance electronic device fabrication plants, operating theatres etc. and for the elimination of gasoline vapour release from vehicles the filter elements can be placed in a suitably shaped container and the monoliths formed to fit into the container. For example the monoliths can be used as circular segments with diameters up to around 10 cm diameter that will be loaded into preformed plastic housings. These will either be simple formed sheets that could be used in for instance ceiling filters for fabrication plants or personal protection devices, or more complex mouldings that will provide for feed and regeneration gas flows for use in for instance vehicle vapour recovery devices. The use of such devices will considerably reduce production costs as there will be no requirement to handle large volumes of granular, dusty material which can give rise to problems with machinery and potential health hazards. The production route will also ensure that filter bypassing can no longer occur.

The invention is illustrated in the following examples.

EXAMPLE 1

In the earlier patent EP 0254551 it was demonstrated that the production of strong materials was very dependent upon the resin curing conditions and that strong extruded materials could only be formed when the crush strength of pelleted materials produced from the dry resin powder exceeded 8N/mm. We have now surprisingly found that with the dough formulations used in the production of the monoliths of the current invention that the production of strong monolithic structures is significantly less dependent upon the extent of cure. Table 1 demonstrates the diametric crush strength of 3 mm extruded rods prepared using a 100 part resin:3part methocell:0.5 part polyethylene oxide formulation.

The resin powder was prepared as follows. Novolak resin powder was cured in the presence of between 3 parts and 9 parts hexamine. The mixed dried powders were placed in trays. For the ramp cure the oven was heated from cold using the following cycle:- 0–100 C in 1.5 hours, hold at 100 C for 1 hour, continue the ramp at 25 C to the final cure temperature, hold for 1 hour, cool to ambient. For the flash cure the trays were placed directly in an oven preheated to the cure temperature and held for 3 hours. The resin block was then milled using a small laboratory mill to produce a powder with a particle size of <70 microns. 100 parts of the resin powder was dry mixed with 10 parts K15 methocell and 1 part of polyethylene oxide. Water was then added whilst mixing using a Kenwood kitchen mixer until a pliable dough was formed. This was extruded to produce 3 mm green extrudate using a small ram extruder mounted in an Instron mechanical testing machine. After air drying overnight the extrudate was further dried at 150 C overnight before carbonisation. Small samples (~10 g) were carbonised in a tube furnace in flowing carbon dioxide. The temperature was raised to 800 C at approximately 100 C/hour and was held at 800 C for 30 minutes before cooling back to room temperature. The carbon radial crush strengths were measured using a standard catalyst testing device and the results represent the mean of 10 measurements.

It can be seen that ramp cure consistently gives a higher extrudate crush strength, particularly at higher hexamine contents where the benefit is frequently greater than x2. Higher strengths are also consistently achieved at lower hexamine contents with hexamine levels of 7 parts and higher giving relatively poor crush strengths. However at the 3 part hex level there is little difference in strength for the ramp cured materials over the complete range of cure temperatures from 130 to 170 C. There was however some evidence for distortion in the carbonised materials at cure temperatures of 130 C and 3 part hexamine.

The results demonstrate that the preferred cure conditions are temperatures of 140–160 C with 3–5 parts hexamine and using the ramped cure profile although flash cure at 130–170 C using 3–5 parts hexamine and flash cure at 130–150 C using 3–5 parts hexamine are acceptable although weaker.

Based on the performance of these materials a minimum crush strength of 5 kg for the 3 mm extrudate defines the requirement for a cured resin for the production of satisfactory monolithic materials.

TABLE 1

Resin Cure Conditions and Their Impact on Extrudate Strength

| | | Hexamine Loading pt/100 pts | | | | | | | |
|---|---|---|---|---|---|---|---|---|---|
| | | 3 | | 5 | | 7 | | 9 | |
| Temp | Ramp | Kg | sd | Kg | sd | Kg | sd | Kg | sd |
| 130 | flash | 9.074 | 1.45 | 9.35 | 2.269 | 4.95 | 1.04 | 5.67 | 0.953 |
| | ramp | 12.93 | 3.45 | | | | | 10.3 | 1.588 |
| 140 | flash | 6.579 | 1.32 | 8.35 | 1.633 | 6.94 | 1.09 | 3.13 | 1.134 |
| | ramp | 12.93 | 3.31 | | | | | 12.1 | 2.541 |

TABLE 1-continued

Resin Cure Conditions and Their Impact on Extrudate Strength

| | | Hexamine Loading pt/100 pts | | | | | | |
|---|---|---|---|---|---|---|---|---|
| | | 3 | | 5 | | 7 | | 9 | |
| Temp | Ramp | Kg | sd | Kg | sd | Kg | sd | Kg | sd |
| 150 | flash | 7.305 | 1.45 | 7.3 | 1.452 | 5.26 | 0.68 | 3.77 | 0.726 |
| | ramp | 14.34 | 2.31 | | | | | 4.49 | 1.361 |
| 160 | flash | 6.261 | 1.04 | 5.85 | 1.134 | 2.13 | 0.64 | 2.63 | 0.544 |
| | ramp | 13.07 | 3.86 | | | | | 4.45 | 1.724 |
| 170 | flash | 6.034 | 1 | 5.99 | 0.998 | 2.72 | 0.41 | 3.45 | 0.907 |
| | ramp | 11.62 | 3.45 | | | | | 7.03 | 2.087 |

EXAMPLE 2

The data in the table demonstrates the effect of powder particle size on the mechanical characteristics of the extruded material. The resin precursor powder was prepared using 5 parts hexamine at a cure temperature of 150 C using the ramped cure technique as described in Example 1. After curing the resin was hammer milled and sieved to provide the particle size fractions used in the example. The extrusion dough and the extrudates were formulated as in Example 1. The dried green extrudate was carbonised as in Example 1. The data in Table 2 demonstrate the variation in crush strength with resin particle size. It can be seen that, based on the target strength of 5 Kg, particle sizes of less than 180 microns give marginally acceptable products although they are all much weaker than would be expected from the smaller resin particles of Example 1 when prepared using the 5 part hexamine formulation and the ramp cure process. Extrudates prepared using particle sizes larger than 180 microns gave very poor strengths and unacceptable extrudates. Based on this data the most preferred cured resin particle size is less than 70 microns and the required cured resin particle resin particle size is less than 180 microns.

TABLE 2

Effect of Resin Particle Size on Extrudate Strength

| | <90 um | | 90–108 um | | 106–125 um | | 125–180 um | | 180–212 um | | 212–250 um | |
|---|---|---|---|---|---|---|---|---|---|---|---|---|
| | Kg | sd | Kg | sd | Kg | sd | Kg | sd | Kg | sd | Kg | sd |
| 150 ramp | 5.7 | 0.91 | 4.45 | 1.407 | 4.95 | 0.95 | 5.49 | 0.726 | 1.815 | 0.726 | 1.27 | 1.3158 |

EXAMPLE 3—Not According to the Invention

The extruded materials of Examples 1 and 2 were compared with pelleted resins made from the same cured precursors as in Example 1 using cure temperatures of 130, 140 and 150 C, 3 parts hexamine and either the flash or ramp cure process. The resulting blocks were hammer milled and the 75–125 micron fraction was separated by sieving. The remaining material was then jet milled using a Hozakawa 100AFG mill to provide the ~70 micron cured resin powder. The powders were then pelleted either as the straight powder or using polyethylene glycol as a lubricant and in one case with additional hexamine curing agent. The pelleting was carried out in a single pellet die using a hydraulic press to pressures of 100 or 150 bar to produce 7 mm diameter green pellets. These were then carbonized as in Example 1. The crush strength of the carbonized pellets was determined as in Example 1. This preparation route is comparable with the procedures in EP 0 254 551.

The results, shown in Table 3, demonstrate the marked difference between the pelleting process and the extrusion process of the current invention.

TABLE 3

Strength of Pelleted Materials

| | | | Radial Crush Strength Kg | | | |
|---|---|---|---|---|---|---|
| | | | 75–125 um | | ~70 um | |
| Temp | | Bar | no additive | PEG | no additive | 5PEG, 5hex |
| 130 | Flash | 150 | 9.44 | 10.65 | 7.65 | 10.27 |
| | | 100 | 4.41 | 8.03 | 6.36 | 6.45 |
| | Ramp | 150 | 7.82 | 11.52 | | |
| | | 100 | 6.53 | 5.99 | | |
| 140 | Flash | 150 | NR | NR | 7.53 | 10.02 |
| | | 100 | NR | NR | NR | NR |
| | Ramp | 150 | 8.07 | 10.40 | 10.11 | 8.90 |
| | | 100 | 5.12 | 6.78 | NR | NR |
| 150 | Flash | 150 | NR | NR | NR | NR |
| | | 100 | NR | NR | NR | NR |
| | Ramp | 150 | NR | NR | 7.70 | 10.11 |
| | | 100 | NR | NR | NR | NR |

NR = pellets too weak to allow measurement

NR=pellets too weak to allow measurement

Comparison with the extrudate results in Table 1 demonstrates that whilst improved pellets were always produced using the ramp cured material, in agreement with the extrudate data, acceptable strength pellets could only be produced using resin cured at 140 C and less, and that at 140 C this was only possible using the ramp cure at the highest pelleting pressures. The optimum cure for the pelleted materials was 130 C. This is in marked contrast to the extruded materials where production at 130 C lead to distortion on firing and the preferred cure condition was 140 or 150 C, with even 160 C giving acceptable materials.

EXAMPLE 4

Stainless steel trays 30 cm square and 5 cm deep were filled with a powder comprising a standard commercial Novolak, supplied by Borden Chemicals with a code number of J1011S. The trays were then placed on a trolley inside a curing oven and the cure was carried out by raising the temperature to 100 C over a period of 1.5 hours, holding at 100° C. for 1 hour, raising the temperature to 150° C. over a further 1 hour and holding at 150° C. for 1 hour. The cured block was then hammer milled to give a coarse powder of greater than 90 microns particle size. The hammer milled powder was then jet milled using a Hozakawa 100AFG jet mill to give a mean particle size of 50 microns.

2 kg of the jet milled powder was then formed into a dough in a Z-blade mixer using approximately 900 gg of water and Methocell (120 g), polyethylene oxide (30 g), Polyethylene glycol (75 g), glycerol (20 g) and LDM Acrylate (60) as extrusion aids. The dough was then extruded using a high pressure ram extruder at a pressure of around 40 bar using a conventional monolith die to produce a 42 mm diameter monolith with a cell structure with wall thickness, "t" in FIG. 1 of 1.2 mm and a channel size, "W" in FIG. 1, of 1.4 mm giving a total open area of 29.4% with a green cell density of 15 cells per square cm. (cpc) or 95 cells per square inch (cpi) The extruded monolith was air dried for at least 12 hours by rotating slowly in ambient air to ensure it remained straight although more rapid drying can be achieved using for instance air less drying.

The monolith could then be either carbonized as a single long length or in segments whose length was consistent with the end use with the appropriate allowance made for linear shrinkage. For long lengths (20 cm) the monolith was carbonized in a six zone furnace using carbon dioxide as the purge gas. A typical carbonization cycle used a ramp rate of 100° C./hour with 1 hour at temperature before cooling back to room temperature. On carbonization the monolith loses 50% weight and approximately 50% volume. This shrinkage results in a substantial increase in cell density and, in cases where a high cell density and a thin cell wall is required, this is a major advantage of the production process. After carbonization the monolith had a structure with a wall thickness ('t' in FIG. 1) of 0.85 mm and a channel width ('W' in FIG. 1) of 0.98 mm giving a total open area of 29.4% with 55 cells per square cm (195 cells per square inch).

The carbonized monolith was then activated in a separate furnace run by heating to 900° C. in flowing carbon dioxide and holding at temperature for a period fixed by the desired weight loss. For shorter sections multiple short lengths were packed into box and the purge gas was then passed through the box under temperature conditions similar to those used for the longer monoliths. If activated monolith segments were required the short segments were placed in the box and surrounded by granular activated carbon to ensure that the activation gas passed through the monolith channels. The box was then heated to at least 900° C. in flowing carbon dioxide for a time set by the desired degree of activation.

EXAMPLE 5

A monolith was formed by the method of Example 1. This monolith was activated at 900 C in flowing carbon dioxide for 1 hour which gave a material with a BET surface area of approximately 800 $m^2/g$.

Figure 2:
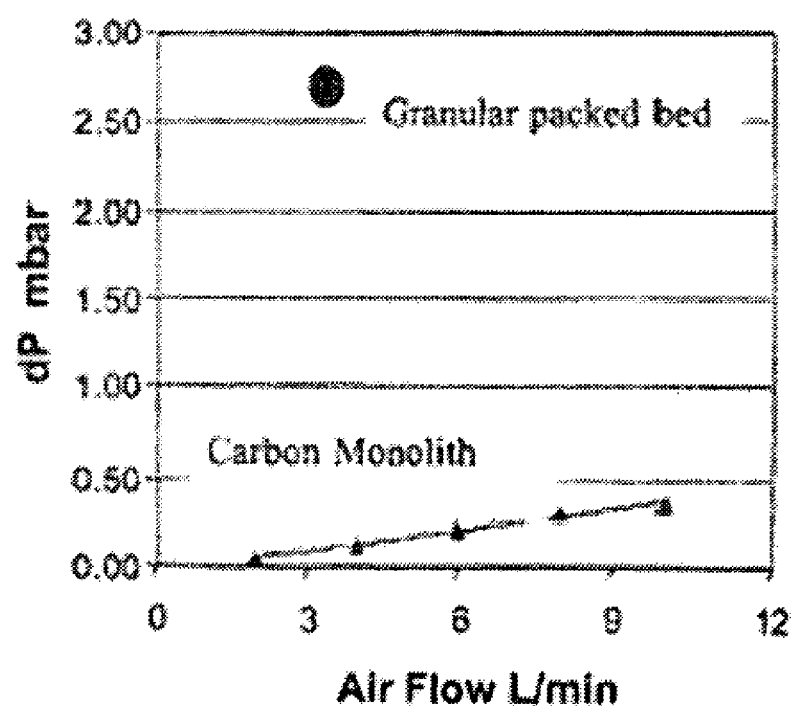
FIG. 2 is a graph showing the comparison of the pressure drop through a monolith according to the present invention compared to that of a filter element of a conventional gas mask.

A comparison of the pressure drop through the monolith compared to that of the filter element of a conventional gas mask is shown in FIG. 2. The granular pressure drop was determined at a flow rate equivalent to 30 L/min through a standard 10 cm diameter, 2 cm deep granular bed. The black point shows a conventional gas mask operating under normal gas flow conditions compared to that of the monolith under identical conditions as against the lowest line that shows the pressure drop for the monolith performance.

Figure 3:
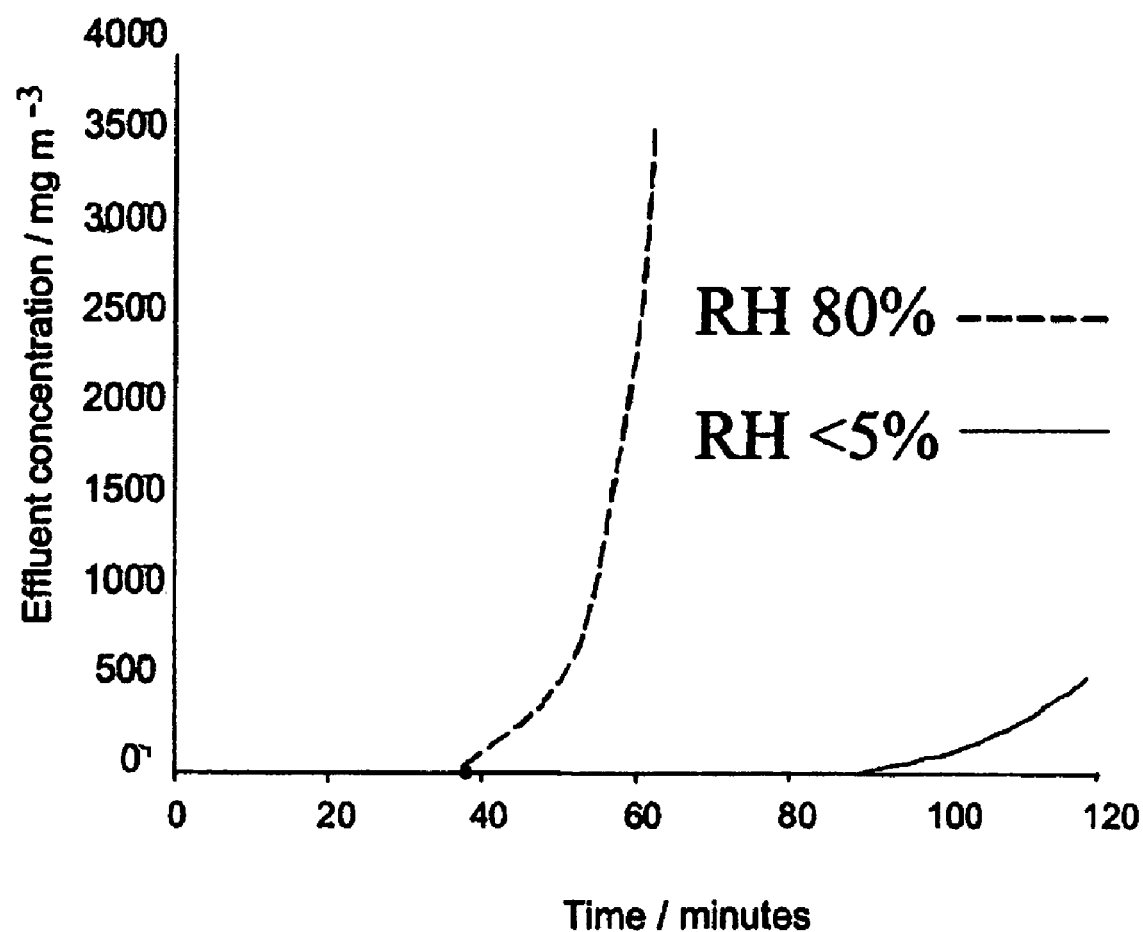
FIG. 3 is a graph showing the adsorption breakthrough performance of an activated monolith according to the present invention.

The adsorption breakthrough performance of the activated monolith is shown in FIG. 3. The 32 mm diameter activated carbon monolith segment was challenged with a gas flow of 2 L/min containing 800 $mg/m^3$ of hexane in dry air.

It can be seen that with a dry gas stream NO molecules penetrated the monolith for 90 minutes at which point there was a sharp breakthrough. When a pre-humidified monolith was challenged with the same gas stream but at 80% relative humidity the breakthrough time was reduced but still gave a very acceptable performance with a breakthrough time of 35 minutes. The capacity of the monolith in dry gas estimated from the breakthrough curve was in good agreement with the equilibrium uptake determined from the adsorption isotherm.

Figure 4:
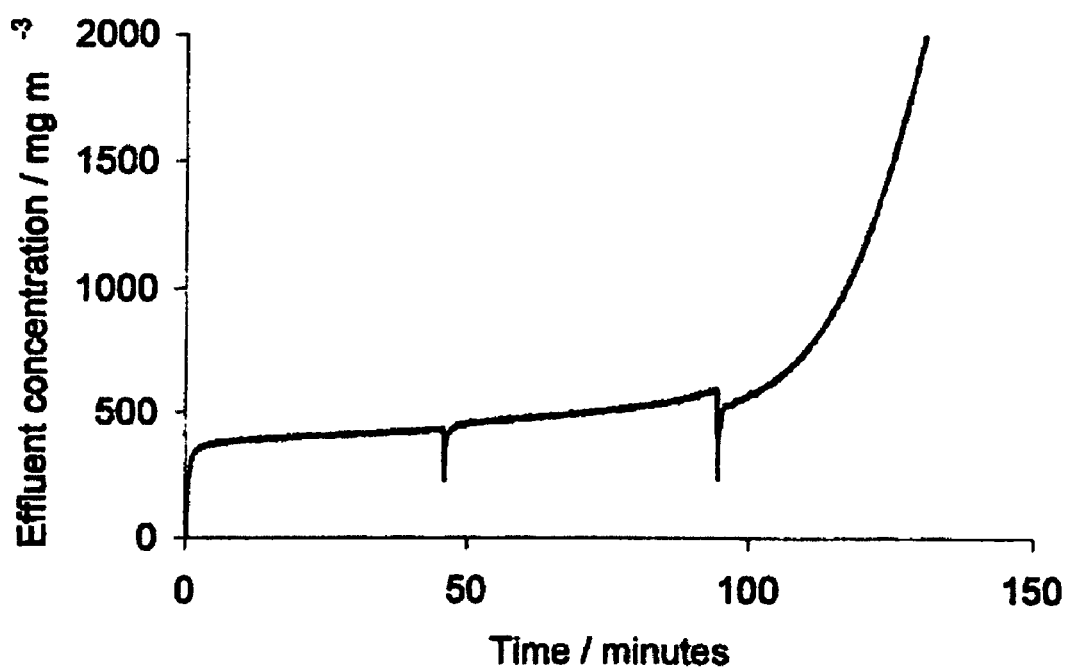
FIG. 4 is a graph showing the breakthrough characteristics of a 7 cm length of a monolith according to the present invention prior to activation when challenged with 8000 mg/m$^3$ of butane at 2 L/minute.

For comparison FIG. 4 shows the breakthrough characteristics of a 7 cm length of the monolith prior to activation when challenged with 8000 mg $m^{-3}$ of butane at 2 L/minute. This demonstrates the critical impact of the micropore diffusion on the monolith performance with an almost immediate low level breakthrough followed by the normal breakthrough at ~100 minutes.

Figure 5:
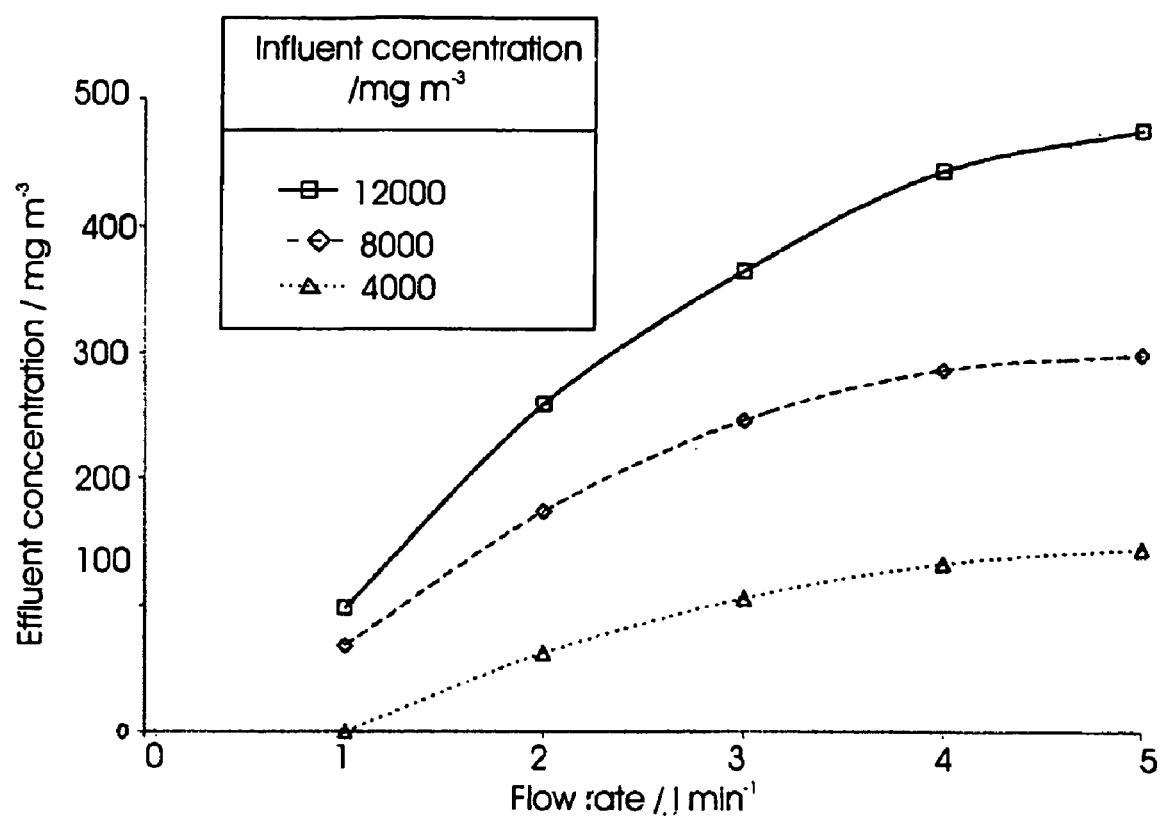
FIG. 5 is a graph showing the relationship between "plateau concentration" and flow rate for carbonised monolith sections exposed to butane.

FIG. 5 shows the relationship between "plateau concentration" and flow rate for carbonised monolith sections exposed to butane (10 cm length, 2 l $min^{-1}$ flow rate, RH<5%). It can be seen that the height of the initial plateau is a function of gas stream concentration and the flow rate passing through the monolith (related to the residence time in the monolith).

Figure 6:
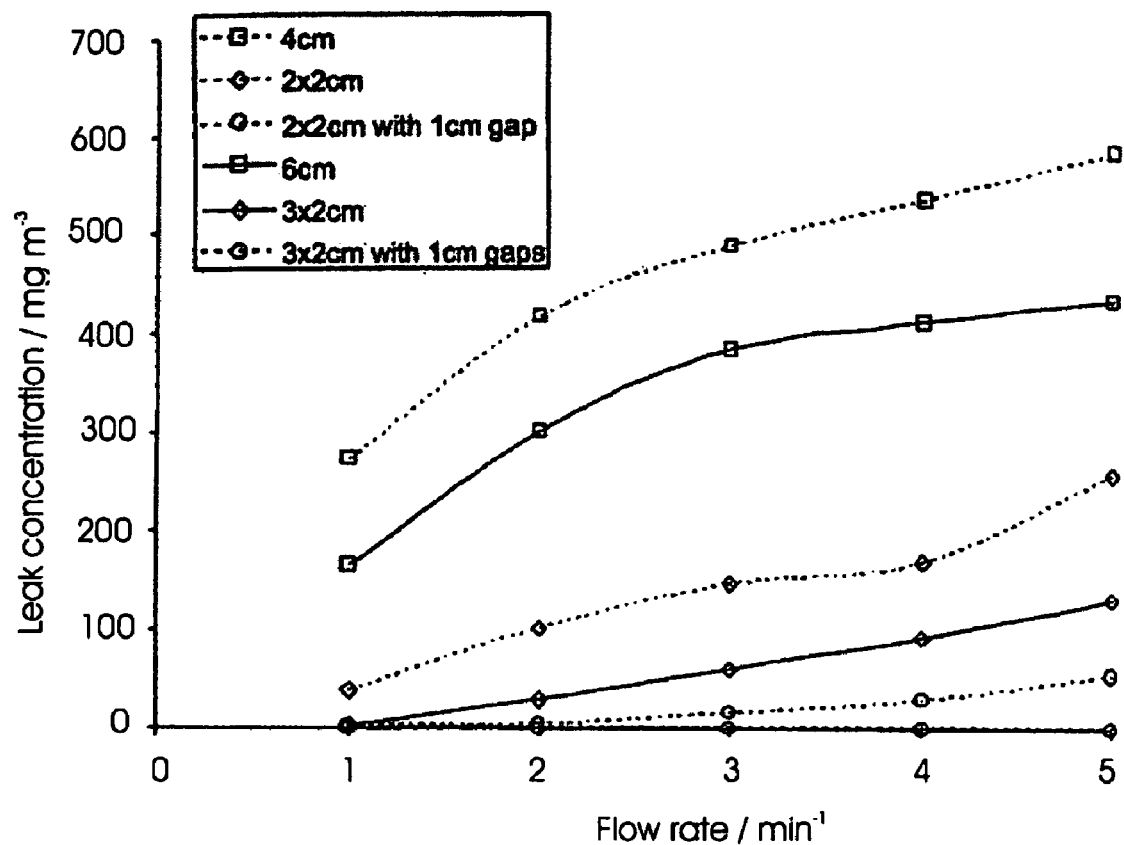
FIG. 6 is a graph showing the comparison of the leakage rate (the initial plateau in FIG. 4) in the inactivated monolith as single pieces and when the 4 cm and 6 cm monolith were present as 2 cm segments close packed or slightly separated by a distance of 1 cm.

FIG. 6 shows a comparison of the leakage rate (the initial plateau in FIG. 4) in the unactivated monolith as single pieces and when the 4 cm and 6 cm monolith were present as 2 cm segments close packed or slightly separated by a distance of 1 cm. This demonstrates the a significant improvement in performance that can be obtained by using multiple, shorter, sections of the monoliths and even more surprisingly that if the segments are separated by a small gap the performance is dramatically further improved.

EXAMPLE 6

The application of the monoliths in vehicle cabin air filtration was examined using a feed gas stream comprising auto-exhaust diluted 50% with air. This was passed through the 31 mm diameter by 620 mm long monoliths made by the method of Example 1 at 5 L/minute that had been pre-aged in humid air for several weeks prior to use. The results in Table 4 show that there was effectively total removal of all contaminants (to below 1 ppb) from feed levels as high as 4 ppm for toluene.

TABLE 4

Removal of auto exhaust contaminants using activated carbon monoliths

| Mass | Carbon Monolith Compound | Auto Exhaust | | Removal Efficiencies | | CM-620 % Reduced |
|---|---|---|---|---|---|---|
| | | IN Direct ppbv | OUT Denuder ppbv | Delta ppbv | MDL* ppbv | |
| M79 | Benzene | 2972 | 0.68 | 2971.32 | 0.05 | 99.98 |
| M93 | Toluene | 4106 | 0.38 | 4105.62 | 0.04 | 99.99 |
| M121 | Tri Me Benzene | 2936 | 0.52 | 2935.48 | 0.04 | 99.98 |
| M129 | Naphthalene | 217.9 | 0.49 | 217.41 | 0.07 | 99.81 |
| M133 | 2,3,4,5-Tetra Me Furan | 275.5 | 0.17 | 275.33 | 0.04 | 99.95 |
| M135 | 1,2,3,5-Tetra Me Benzene | 1001 | 0.2 | 1000.8 | 0.04 | 99.98 |
| M143 | Me-Naphthalene | 93.1 | 0.27 | 92.83 | 0.02 | 99.73 |
| M155 | Biphenyl | 3.54 | 0.041 | 3.499 | 0.02 | 98.9 |
| M167 | Fluorene | 0.87 | 0.009 | 0.861 | 0.007 | 99.77 |
| M179 | Anthracene/Phenanthrene | 0.58 | 0.012 | 0.568 | 0.007 | 99.14 |
| M193 | Me-Anthracene | 0.19 | 0.006 | 0.184 | 0.007 | 100** |
| M203 | Pyrene | 0.088 | 0.004 | 0.084 | 0.007 | 100** |
| M229 | Chyrsene | 0.006 | 0.003 | 0.003 | 0.007 | 0 |
| | | | | | | 5 lpm |

EXAMPLE 7

Gasoline Vapour Recovery—Inlet Manifold Filters

Figure 9:
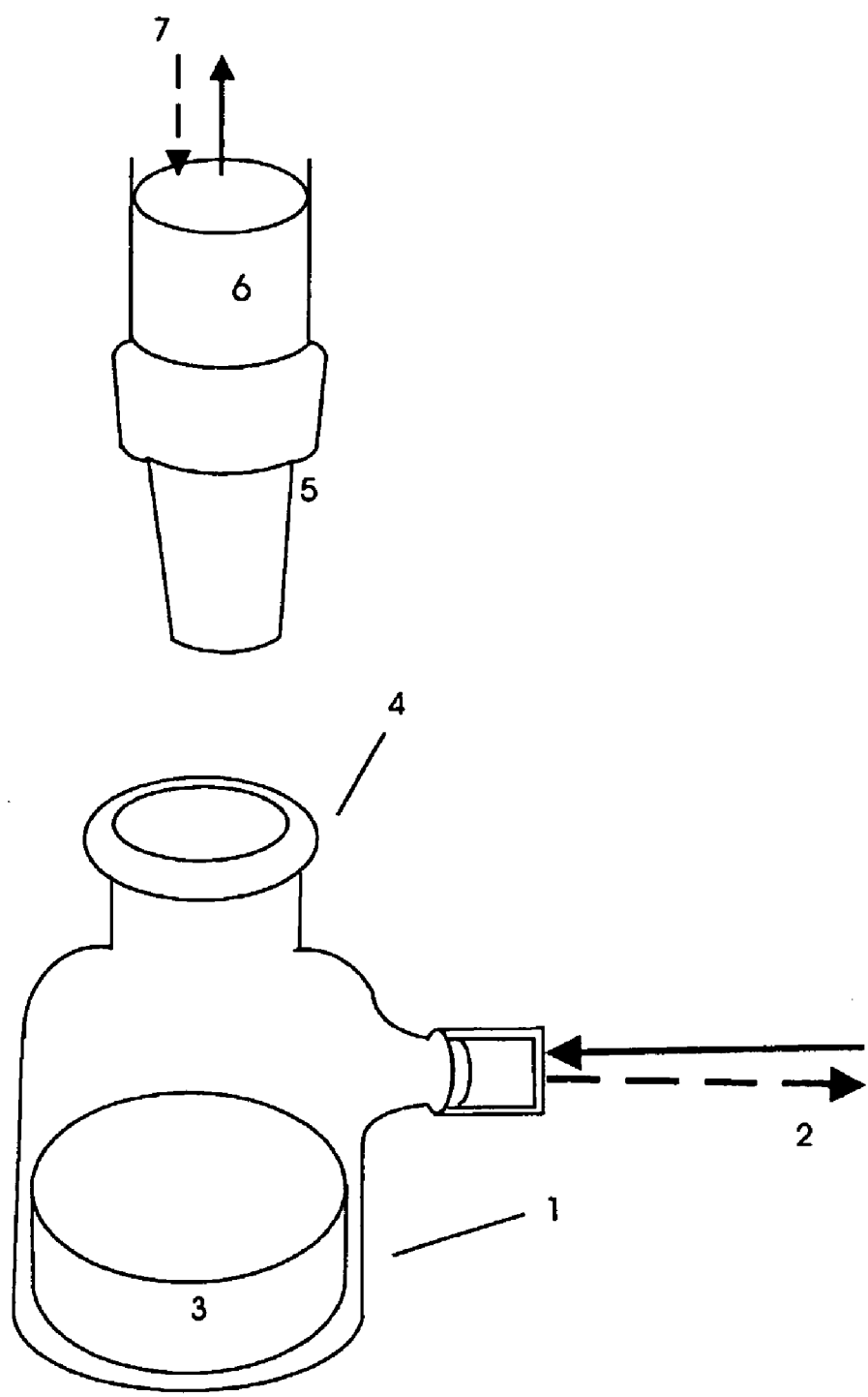
FIG. 9 is an apparatus used to absorb toluene on the monoliths according to the present invention.

The adsorption of gasoline in air inlet ducts was simulated using toluene as the worst case contaminant for regeneration. The apparatus used is shown in FIG. 9. This consists of a bottle (1) acting as a toluene reservoir, containing toluene (3).

Approximately 2 cm lengths of monolith (6) made by the method of example 1 were mounted on top of a ground glass joint (4), (5) using shrink wrap. This was then placed in the top of toluene reservoir (1). Air was flowed through the vessel through inlet (2), over the surface of the toluene and then through the monolith (6) to the atmosphere at (7). With the vessel at 30 C and an air flow of ~600 ml/minute the toluene vapour concentration, determined from the rate of loss of toluene from the reservoir was ~0.37% volume. The performance was monitored by weighing the entire system and the stopper containing the monolith at time intervals. During the initial adsorption phase, when toluene vapour in the air was adsorbed in the monolith there was no weight loss for the entire system but the monolith steadily gained in weight showing the transfer of the toluene from the reservoir to the monolith. Once the monolith was saturated the entire system lost weight steadily whilst there was no further gain in the monolith weight. This can be seen in FIG. 7 the region between these two zones, where there was a reduced weight gain in the monolith and the onset of some weight loss from the overall system, corresponds to the breakthrough region in a conventional breakthrough plot. The data provides the monolith capacity at initial breakthrough and the saturation capacity. It can be seen that the breakthrough on the first cycle occurs between 350 and 300 minutes whilst the subsequent breakthroughs occur at around 50 minutes reflecting the loss of capacity due to the incomplete removal of the adsorbed gasoline. Nonetheless the capacity in the later cycles of ~20% is sufficient for the inlet manifold application.

Figure 7:
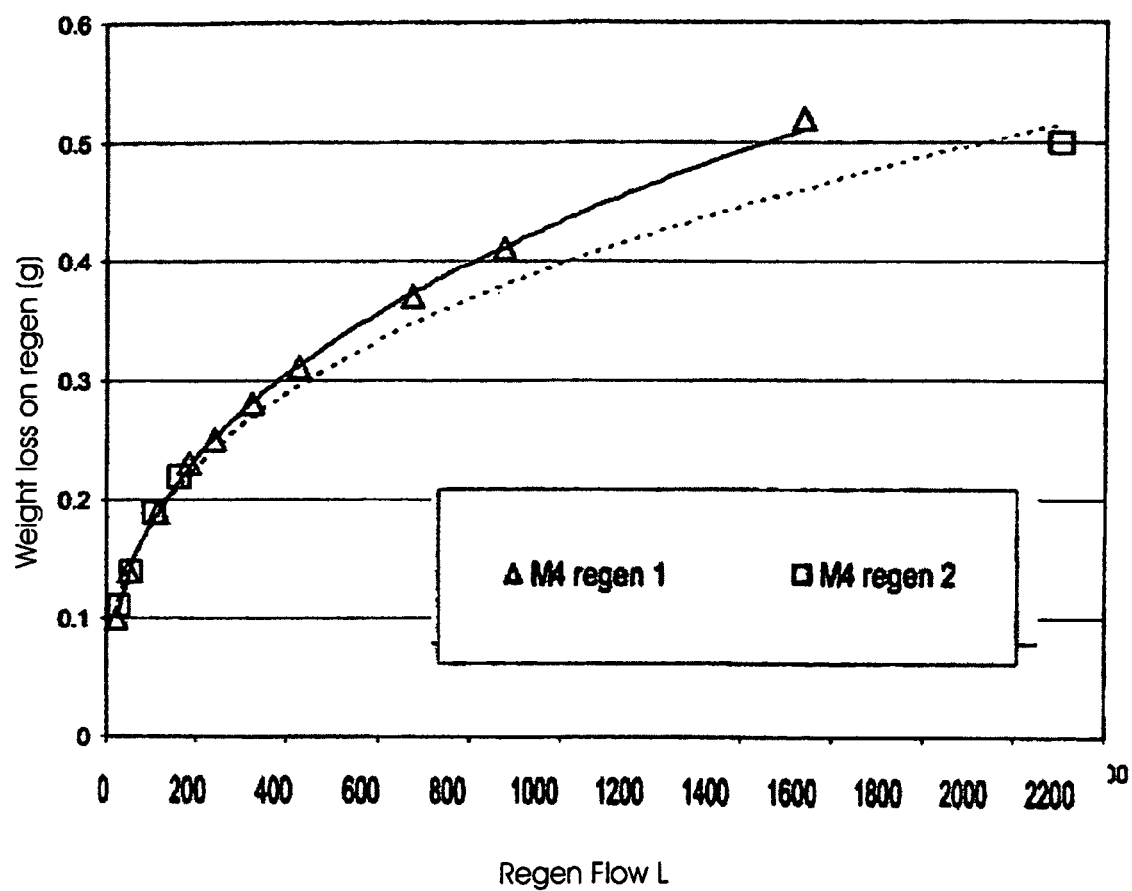
FIG. 7 is a graph showing the toluene weight loss from a monolith according to the present invention during regeneration.

The monolith was regenerated between adsorption cycles. The toluene reservoir was replaced with an empty reservoir and air was drawn through the monolith using a diaphragm pump. This was continued until 1800 L of air had been passed through the monolith—a value fixed by the regeneration requirements in induction manifold filters, assuming a full filter diameter of 10 cm. During this period the weight loss of the system, equivalent to the toluene weight loss from the monolith, was determined. The results are shown in FIG. 7. It can be seen that the rate of weight loss steadily decreases reflecting the higher heat of adsorption at lower coverages. After 1800 L of air had been passed the experiment was stopped. The weight loss at this stage reflects the first cycle working capacity of the monolith.

Figure 8:
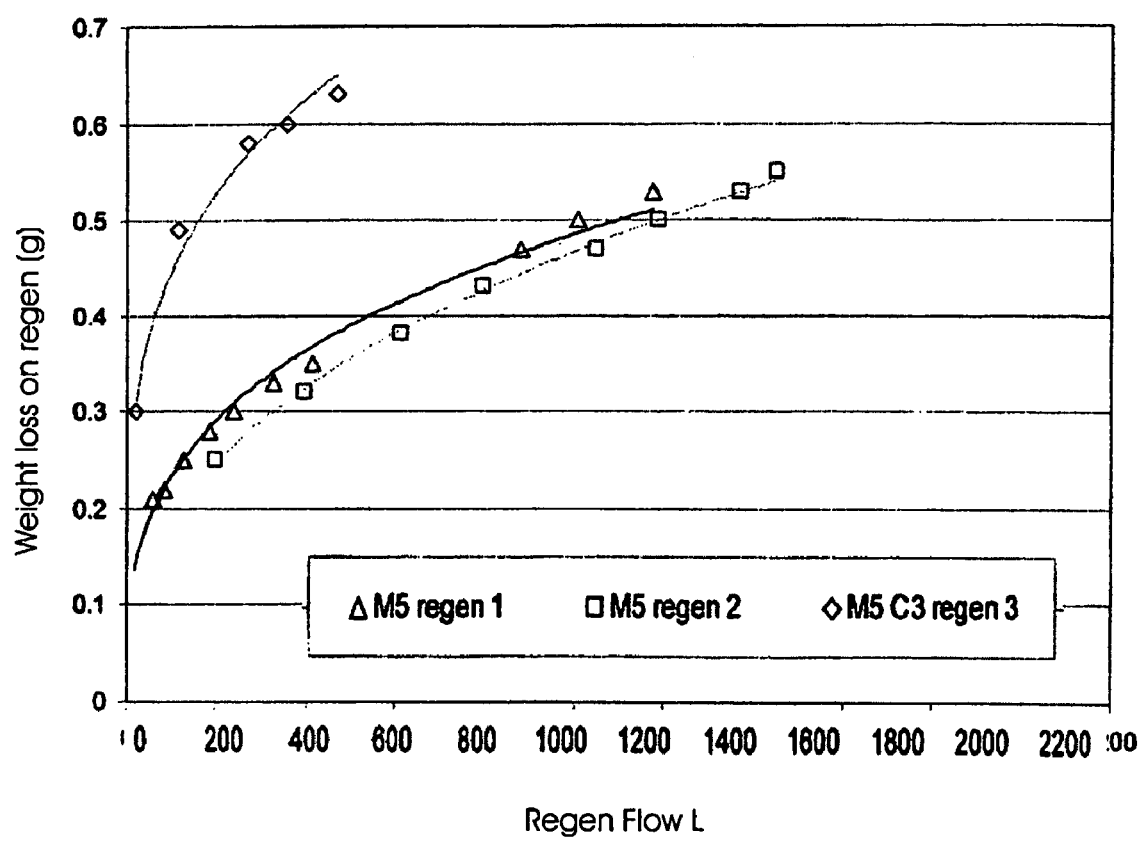
FIG. 8 is a graph showing the toluene weight loss from a monolith according to the present invention during regeneration after a second adsorption cycle.

The adsorption cycle was then repeated with the results shown in FIG. 8. The second weight uptake was approximately equal to the weight loss in the first regeneration cycle. These adsorption and regeneration cycles were then repeated several times. The results demonstrated that there was little change in the system toluene working capacity after the first cycle with a toluene working capacity of 7. This is well in excess of the target working capacity for air inlet filters.

EXAMPLE 8

Figure 10:
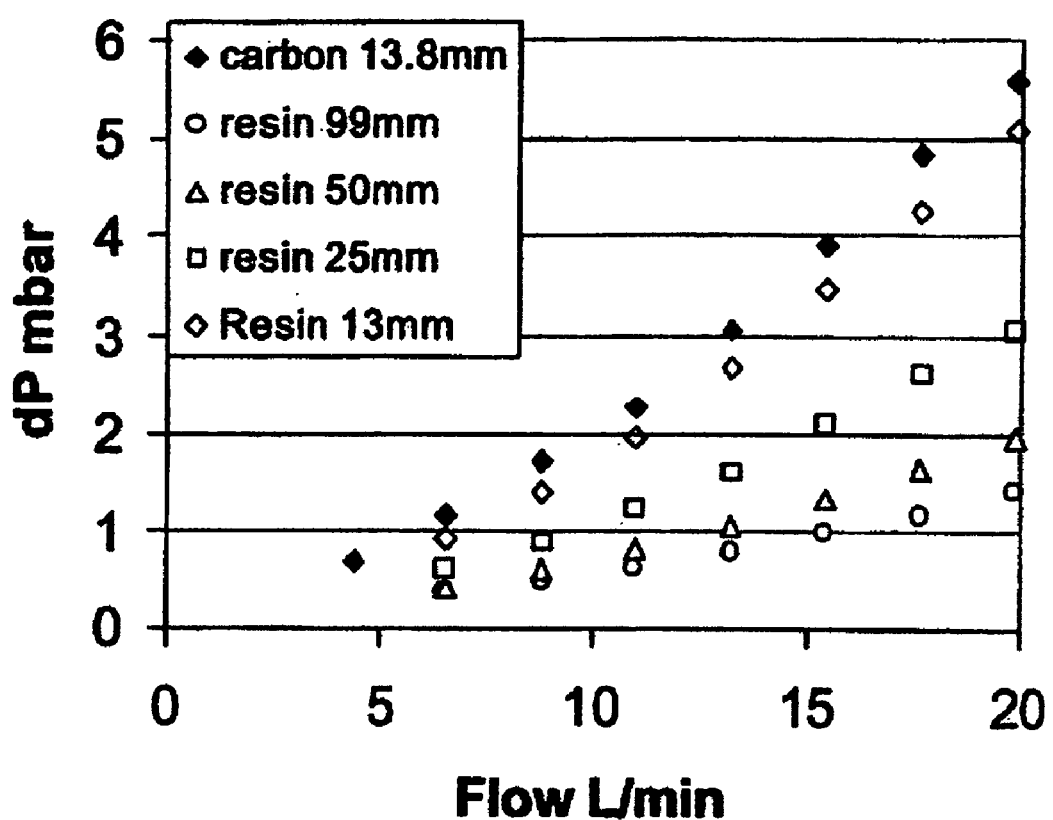
FIG. 10 is a graph showing the pressure drop through the resin monoliths according to the present invention as a function of monolith length and comparing a short segment of the carbonised monoliths.

The standard dough formulation, as described in Example 4, was used to extrude monoliths with an outside diameter of approximately 10 mm and a green cell density of 44 cpc and a carbonised cell density of 91 cpc. After carbonisation the monoliths have an OD of 7.3 mm. The pressure drop through the resin monoliths as a function of monolith length and a short segment of the carbonised monoliths was determined and is shown in FIG. 10. The results have been normalised to the pressure drop through 1 cm cross section and 1 cm length to allow a direct comparison. It can be seen that the resistance to flow increases as the length decreases reflecting the higher pressure drop at the entrance to the monoliths due to turbulence.

EXAMPLE 9

Figure 11:
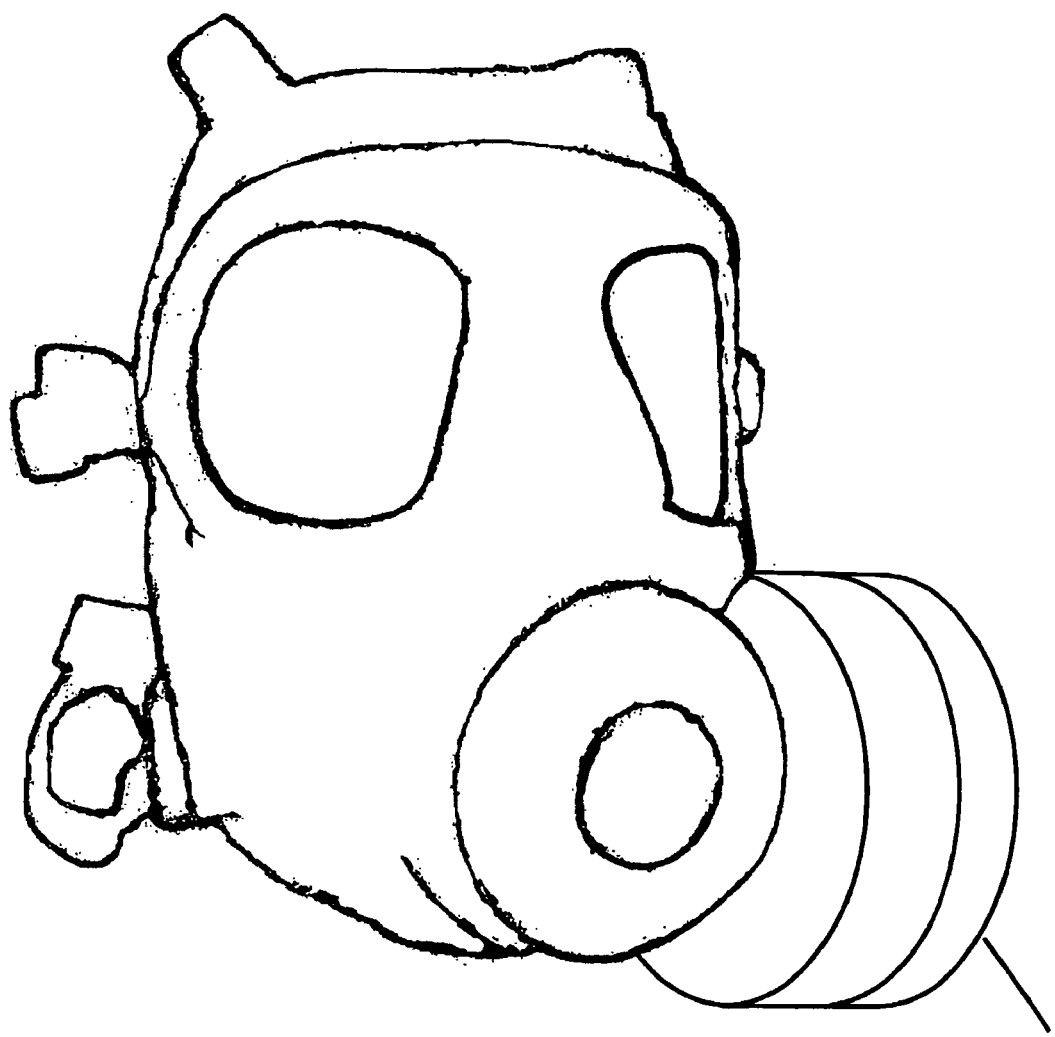
FIG. 11 shows a conventional military gas mask with a large canister attached to the side.
Figure 12:
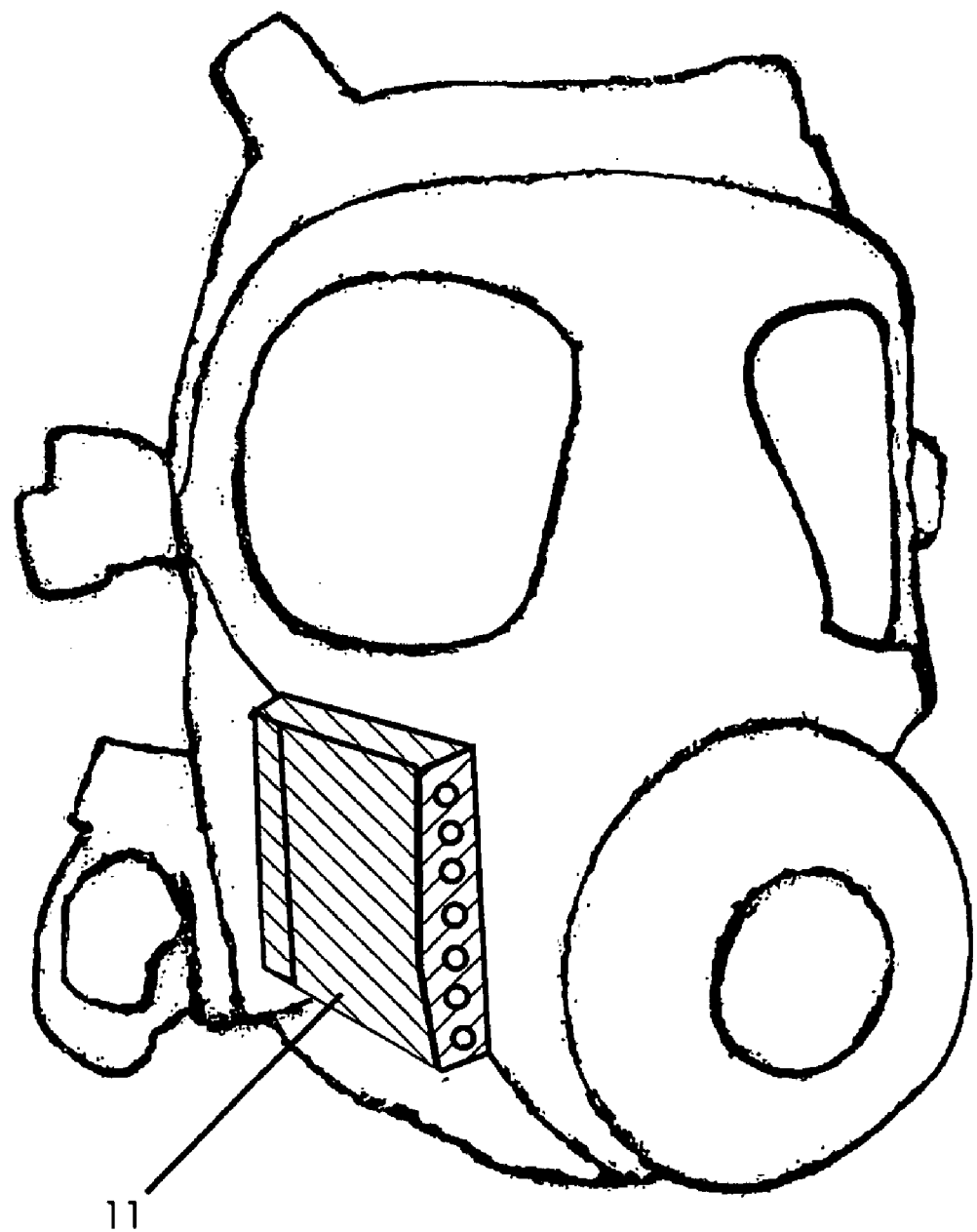
FIG. 12 shows a new design of mask based on the low pressure drop small diameter monoliths according to the present invention.
Figure 13:
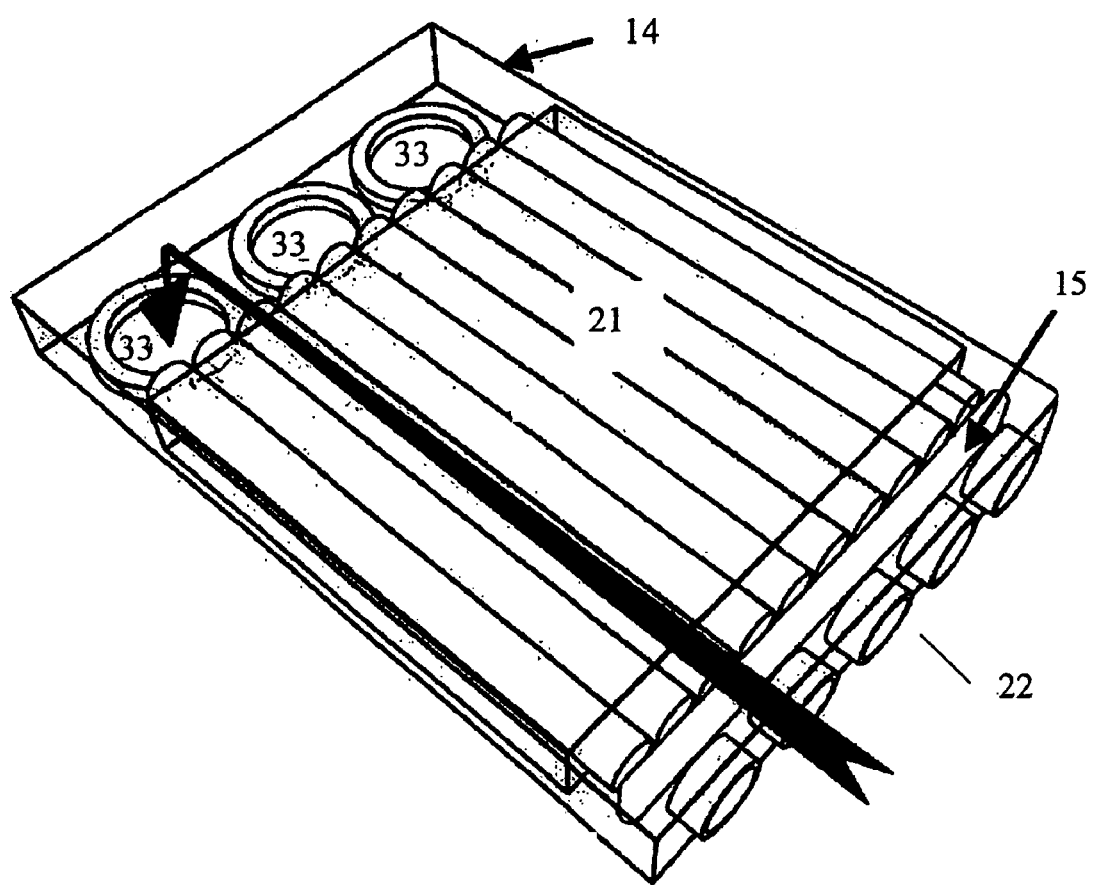
FIG. 13 shows a "flat pack" of monoliths according to the present invention.

The low pressure drop of the monolith structures and their enhanced adsorption potential can be made use of in a novel gas mask configuration. FIG. 11 shows a conventional military gas mask with the large canister (10) attached to the side. These canisters present a significant physiological load to the wearer due to their pressure drop and are also inconvenient. A new design of mask based on the low pressure drop small diameter monoliths of Example 8 is shown in FIG. 12. This comprises a "flat pack" of monoliths (11) attached to either side of the face mask. This design will allow a lower pressure drop, reducing the physiological impact of the mask, combined with greater convenience and capacity. A possible structure for the "flat pack" is shown in FIG. 13 in which a series of monoliths (21) are packed flat in container (14). Air is breathed through inlet (22), passes through manifold (15) into monoliths (21) and through outlets (33) into the mask.

The invention claimed is:

1. A filter element for removing contaminants from gases comprising a monolithic porous carbon structure, wherein the non-filled monolithic porous carbon structure is a single piece and is not granular and is not composed of granular carbons bound together by a binder and the walls of the carbon monolithic structure have continuous voids or pores through which liquid or vapours can pass, and wherein the carbon of said monolithic porous carbon structure is not bound to silica.

2. A filter element according to claim 1, wherein the non-filled monolithic porous carbon structure has a cell structure wherein the channel size is between about 100 microns and 2000 microns and the wall thickness is between about 100 microns and 2000 microns with an open area of between about 30 and 60%.

3. A filter element according to claim 1, wherein the non-filled monolithic porous carbon structure has a surface area of at least 700 m$^2$/g.

4. A filter element according to claim 2, wherein the non-filled monolithic porous carbon structure has a surface area of at least 700 m$^2$/g.

5. A filter element according to claim 1, wherein the non-filled monolithic porous carbon structure has a surface area in excess of 1000 m$^2$/g.

6. A filter element according to claim 2, wherein the non-filled monolithic porous carbon structure has a surface area in excess of 1000 m$^2$/g.

7. A filter element according to claim 1, wherein the non-filled monolithic porous carbon structure has a length of about 1 to 10 cm.

8. A filter element according to claim 1, wherein the non-filled monolithic porous carbon structure is produced by partially curing a phenolic resin to a solid, comminuting the partially cured resin, extruding the comminuted resin, sintering the extruded resin so as to produce a form-stable sintered product and carbonising the form-stable sintered product.

9. A filter element according to claim 2, wherein the non-filled monolithic porous carbon structure is produced by partially curing a phenolic resin to a solid, comminuting the partially cured resin, extruding the comminuted resin, sintering the extruded resin so as to produce a form-stable sintered product and carbonising the form-stable sintered product.

10. A filter element according to claim 1, comprising a plurality of filter elements wherein each of the filter elements is from about 1 to 3 cm in length separated from an adjacent filter element by a gap of about 0.5 to 1.5 cm.

11. An apparatus for the removal of contaminants from gases such as air, comprising a container containing (i) a filter element; (ii) a gas inlet for the container and (iii) a gas outlet for the container whereby gases can pass via the inlet through the filter element and out through the outlet and in which the filter element comprises a non-filled monolithic porous carbon structure which is a single piece and is not granular and is not composed of granular carbons bound together by a binder and the walls of the carbon monolithic structure have continuous voids or pores through which liquid or vapours can pass, and wherein the carbon of said monolithic porous carbon structure is not bound to silica.

12. Apparatus according to claim 11, wherein the non-filled monolithic porous carbon structure has a cell structure wherein the channel size is between about 100 microns and 2000 microns and the wall thickness is between about 100 microns and 2000 microns with an open area of between about 30 and 60%.

13. Apparatus according to claim 12, wherein the non-filled monolithic porous carbon structure has a surface area of at least 700 m$^2$/g.

14. Apparatus according to claim 11, wherein the non-filled monolithic porous carbon structure has a surface area in excess of 1000 m$^2$/g.

15. Apparatus according to claim 12, wherein the non-filled monolithic porous carbon structure has a surface area in excess of 1000 m$^2$/g.

16. Apparatus according to claim 11, wherein there is a plurality of filter elements and wherein each of the filter elements is from about 1 to 3 cm in length and is separated from an adjacent filter element by a gap of about 0.5 to 1.5 cm.

17. Apparatus according to claim 12, wherein there is a plurality of filter elements and wherein each of the filter elements is from about 1 to 3 cm in length and is separated from an adjacent filter element by a gap of about 0.5 to 1.5 cm.

18. Apparatus according to claim 11, wherein the non-filled carbon monolithic structure is produced by partially curing a phenolic resin to a solid, comminuting the partially cured resin, extruding the comminuted resin, sintering the extruded resin so as to produce a form-stable sintered product and carbonising the form-stable sintered product.

19. Apparatus according to claim 12, wherein the non-filled carbon monolithic structure is produced by partially curing a phenolic resin to a solid, comminuting the partially cured resin, extruding the comminuted resin, sintering the extruded resin so as to produce a form-stable sintered product and carbonising the form-stable sintered product.

20. Apparatus according to claim 11, further comprising a respirator.

\* \* \* \* \*